(12) United States Patent
Chong et al.

(10) Patent No.: US 9,479,788 B2
(45) Date of Patent: Oct. 25, 2016

(54) SYSTEMS AND METHODS FOR LOW COMPLEXITY ENCODING AND BACKGROUND DETECTION

(71) Applicant: QUALCOMM Incorporated, San Diego, CA (US)

(72) Inventors: In Suk Chong, San Diego, CA (US); Sungwon Lee, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 14/216,205

(22) Filed: Mar. 17, 2014

(65) Prior Publication Data

US 2015/0264367 A1    Sep. 17, 2015

(51) Int. Cl.
| | |
|---|---|
| *H04N 19/103* | (2014.01) |
| *H04N 19/137* | (2014.01) |
| *H04N 19/176* | (2014.01) |
| *H04N 19/23* | (2014.01) |
| *H04N 19/557* | (2014.01) |
| *H04N 19/174* | (2014.01) |

(52) U.S. Cl.
CPC ............ *H04N 19/23* (2014.11); *H04N 19/103* (2014.11); *H04N 19/137* (2014.11); *H04N 19/174* (2014.11); *H04N 19/176* (2014.11); *H04N 19/557* (2014.11)

(58) Field of Classification Search
None
See application file for complete search history.

(56) References Cited

U.S. PATENT DOCUMENTS

| | | | | |
|---|---|---|---|---|
| 5,926,226 | A * | 7/1999 | Proctor | G06T 9/008 375/240.14 |
| 8,965,140 | B1 * | 2/2015 | Xu | G06K 9/38 382/195 |
| 2003/0039312 | A1 * | 2/2003 | Horowitz | H04N 19/159 375/240.24 |
| 2004/0057516 | A1 * | 3/2004 | Kim | H04N 19/115 375/240.16 |
| 2004/0258154 | A1 | 12/2004 | Liu et al. | |

(Continued)

FOREIGN PATENT DOCUMENTS

| | | |
|---|---|---|
| CN | 102395030 A | 3/2012 |
| EP | 1991004 A2 | 11/2008 |
| JP | 2003032688 A | 1/2003 |

OTHER PUBLICATIONS

International Search Report and Written Opinion—PCT/US2015/020197—ISA/EPO—Jun. 10, 2015.

(Continued)

*Primary Examiner* — Reza Aghevli
(74) *Attorney, Agent, or Firm* — Knobbe Martens Olson & Bear LLP

(57) ABSTRACT

Systems and methods for low complexity encoding and background detection are described herein. One aspect of the subject matter described in the disclosure provides a video encoder comprising a memory configured to store a video block. The video encoder further comprises a processor in communication with the memory. The processor is configured to determine whether the video block is background by comparing the video block to a corresponding block located in a previous temporal frame. The processor is further configured to determine, when the video block is not background, whether one or more sub-blocks of the video block are background by comparing the sub-blocks to corresponding sub-blocks located in the previous temporal frame.

30 Claims, 5 Drawing Sheets

(56) References Cited

U.S. PATENT DOCUMENTS

| | | | |
|---|---|---|---|
| 2005/0047504 A1 | 3/2005 | Sung et al. | |
| 2006/0204113 A1* | 9/2006 | Wang | H04N 19/147 |
| | | | 382/236 |
| 2007/0009042 A1* | 1/2007 | Craig | H04N 19/176 |
| | | | 375/240.24 |
| 2007/0297513 A1 | 12/2007 | Biswas et al. | |
| 2013/0094571 A1* | 4/2013 | Zhang | H04N 19/159 |
| | | | 375/240.03 |
| 2013/0170557 A1* | 7/2013 | Wang | H04N 19/00 |
| | | | 375/240.24 |
| 2013/0235935 A1 | 9/2013 | Kang et al. | |
| 2014/0037005 A1* | 2/2014 | Lee | H04N 19/56 |
| | | | 375/240.16 |

OTHER PUBLICATIONS

Liu P., et al., "Research on Fast Algorithm for Video ROI Detection," Journal of Software, Nov. 2013, vol. 8 (11), pp. 2871-2880.

* cited by examiner

SYSTEMS AND METHODS FOR LOW COMPLEXITY ENCODING AND BACKGROUND DETECTION

TECHNICAL FIELD

This disclosure relates to video encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, smartphones, video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. CUs may be further partitioned into one or more prediction units (PUs) to determine predictive video data for the CU. The video compression techniques may also partition the CUs into one or more transform units (TUs) of residual video block data, which represents the difference between the video block to be coded and the predictive video data. Linear transforms, such as a two-dimensional discrete cosine transform (DCT), may be applied to a TU to transform the residual video block data from the pixel domain to the frequency domain to achieve further compression. Further, video blocks in an intra-coded (I) slice of a picture may be encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

Video encoders may utilize certain units (e.g., mode decision and/or motion estimation units) to encode video information. To speed up processing while minimizing performance degradation, many encoders use pre-processing engines to lower the complexity of these units. One such pre-processing engine is "background detection," which may be used to distinguish static (or "not changing") content in a video frame (e.g., background content) from changing (or "moving") content (e.g., foreground content). Once the background content has been determined, the encoder may apply lower complexity processes (e.g., lower complexity mode decision, simpler motion vector determination, simpler interrupt addition checks, lower motion estimation processes, etc.) when encoding that content, because encoding background frames may simply involve copying content from the appropriate blocks of previous frames to the current frame. In some cases, the results of a motion vector search may be the only requirement for the encoding of a background block.

Video encoding units (e.g., mode decision and motion estimation units) have become more complex and computationally intensive in modern video encoders (e.g., the HEVC encoder). The time and computational resources required for these units to perform certain functions (e.g., detecting background areas) has increased. One reason for this is that older video standards, such as AVC, only utilized transform sizes up to 8×8. However, the more modern HEVC standard utilizes up to 16×16 and 32×32 forward transform and inverse transform sizes. The larger transforms require more complexity and cycles when blocks are analyzed to detect whether they include only background content. In the interest of coding efficiency, the current standards would benefit from a process that reduces the complexity of background detection methods. Some advantages of the techniques disclosed herein relate to improving coding efficiency and reducing computational resource requirements during video encoding by reducing the complexity of background detection methods, which may then allow for less complex mode decision and motion estimation.

SUMMARY

In general, this disclosure describes techniques related to reducing the complexity and cycles required for a video encoder (e.g., an HEVC video encoder) to detect background content, which may further simplify the overall mode decision and motion estimation processes for the video encoder. The techniques may further address issues relating to adaptively adjusting a background detection threshold value, allowing the video encoder to save on computational resources while also preserving video quality.

The details of one or more examples are set forth in the accompanying drawings and the description below. Other features, objects, and advantages will be apparent from the description and drawings, and from the claims.

One aspect of the subject matter described in the disclosure provides a video encoder comprising a memory configured to store a video block. The video encoder further comprises a processor in communication with the memory. The processor is configured to determine whether the video block is background by comparing the video block to a corresponding block located in a previous temporal frame. The processor is further configured to determine, when the video block is not background, whether one or more sub-blocks of the video block are background by comparing the sub-blocks to corresponding sub-blocks located in the previous temporal frame.

Another aspect of the subject matter described in the disclosure provides a method of encoding video. The method includes storing a video block. The method further includes determining whether the video block is background by comparing the video block to a corresponding block located in a previous temporal frame. The method further includes determining, when the video block is not background, whether one or more sub-blocks of the video block are background by comparing the sub-blocks to corresponding sub-blocks located in the previous temporal frame.

Another aspect of the subject matter described in the disclosure provides a non-transitory computer readable medium. The medium comprises code that, when executed, causes an apparatus to store a video block. The medium further comprises code that, when executed, causes an apparatus to determine whether the video block is background by comparing the video block to a corresponding block located in a previous temporal frame. The medium further comprises code that, when executed, causes an apparatus to determine, when the video block is not background, whether one or more sub-blocks of the video block are background by comparing the sub-blocks to corresponding sub-blocks located in the previous temporal frame.

Another aspect of the subject matter described in the disclosure provides an apparatus for encoding video. The apparatus comprises means for storing a video block. The apparatus further comprises means for determining whether the video block is background by comparing the video block to a corresponding block located in a previous temporal frame. The apparatus further comprises means for determining, when the video block is not background, whether one or more sub-blocks of the video block are background by comparing the sub-blocks to corresponding sub-blocks located in the previous temporal frame.

Figure 1:
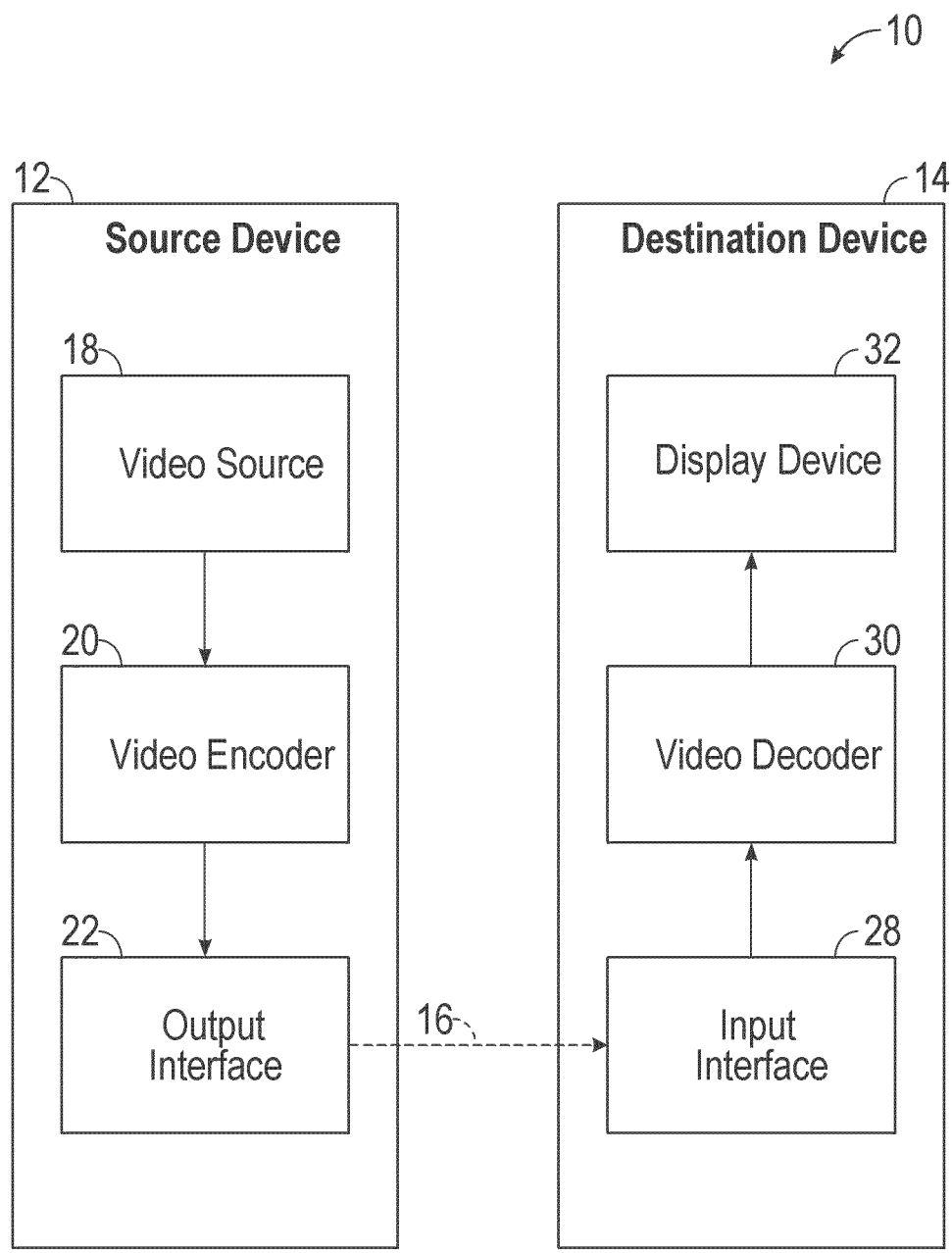
FIG. 1 is a block diagram illustrating an example video encoding and decoding system that may utilize techniques in accordance with aspects described in this disclosure.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The techniques described in this disclosure generally relate to forward transforms during video encoding, particularly in regards to the High-Efficiency Video Coding (HEVC) standard and its extensions.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG).

As mentioned above, the HEVC standard utilizes forward transforms (e.g., in the HEVC encoder) and inverse transforms of up to 32×32 in size, whereas the AVC standard only utilized up to an 8×8 transform size. The larger transform sizes increase the coding efficiency of large code blocks in HEVC; however, it also increases the complexity, computing cycles, and processing time (e.g., when detecting background areas) as compared to the smaller transform sizes. The methods described in this disclosure may reduce the increased complexity and cycles required to detect background content.

In some implementations, detecting background content may allow for overall less complex mode decision and motion estimation, because the video encoder may be configured to simplify the mode decision and motion estimation when processing the background areas as opposed to the foreground areas, as further described below in regards to FIGS. 4-5. The video encoder may further be configured to adaptively adjust a threshold for background detection using distance metric values from previous frames. By systematically detecting background areas and adaptively adjusting the background detection threshold value, the methods described in this disclosure may allow a video encoder to save on computational resources while also preserving video quality.

In the video codecs that use block-based processing (e.g., HEVC, in which video frames may be partitioned into video blocks or coding units), prediction blocks or prediction units (e.g., from inter or intra prediction) may be subtracted from original pixels. As further explained above, such residual data may then be transformed into residual transform coefficients using forward transforms (e.g., discrete cosine transforms), quantized, and entropy encoded (e.g., to achieve further compression). The entropy encoding may be performed using various entropy coding engines (e.g., CAVLC, CABAC, etc.), which are further described below. Afterwards, and as also further described below, a decoder may then entropy decode, dequantize, and inverse transform the coefficients. Finally, the coefficients may be added back to the prediction blocks to form reconstructed pixels.

In one embodiment of video coding, an image block may first be predicted using pixels in reconstructed temporally and/or spatially neighboring blocks. The prediction error (sometimes referred to as "residue") may then be transformed and quantized. For example, if S is a residue block of size N×N, the transformed block K can be derived using matrix multiplication as follows:

$$K = A * S * B$$

where K, A, and B are also of size N×N. A is the vertical transform matrix and B is the horizontal transform matrix. In some embodiments, A and B are the transpose of each other, (e.g., B=A' where "'" means transpose). In other embodiments, A and B are not the transpose of each other. When A and B are the transpose of each other, the previous equation becomes:

$$K=A*S*A'$$

Each transform (A and B) may include any of a variety of transforms. In some embodiments, the transform includes one of a discrete cosine transform (DCT), a discrete sine transform (DST), a Hadamard transform, a Haar transform, etc.

In an SVC extension, there may be multiple layers of video information. The bottom layer may serve as a base layer (BL), and the top layer may serve as an enhanced layer (EL) or "enhancement layer." All layers between the top and bottom layers may serve as either or both ELs or BLs. SVC may be used to provide quality scalability (or signal-to-noise ratio, SNR), spatial scalability, and/or temporal scalability. An enhanced layer may have different spatial resolution than a base layer. Prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer. One particular coding mode for an enhancement layer called the "Intra BL mode" includes a texture that may be predicted using the texture of the corresponding (sometimes referred to as "co-located", e.g., located at the same spatial location) blocks in base layer.

In inter-layer residual prediction, the residue of the base layer may be used to predict the current block in the enhancement layer. The residue may be defined as the difference between the temporal prediction for a video unit and the source video unit. In residual prediction, the residue of the base layer is also considered in predicting the current block. For example, the current block may be reconstructed using the residue from the enhancement layer, the temporal prediction from the enhancement layer, and the residue from the base layer. The current block may be reconstructed according to the following equation:

$$\hat{I}e=re+Pe+rb$$

where $\hat{I}e$ denotes the reconstruction of the current block, re denotes the residue from the enhancement layer, Pe denotes the temporal prediction from the enhancement layer, and rb denotes the residue prediction from the base layer.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer prediction samples.

To use inter-layer residual prediction for a macroblock (MB) in the enhancement layer, the co-located macroblock in the base layer should be an inter MB, and the residue of the co-located base layer macroblock may be upsampled according to the spatial resolution ratio of the enhancement layer. In inter-layer residual prediction, the difference between the residue of the enhancement layer and the residue of the upsampled base layer may be coded in the bitstream. The residue of the base layer may be normalized based on the ratio between quantization steps of base and enhancement layers.

In general, motion compensation is performed by adding the temporal prediction and the residue for the current block as follows:

$$\hat{I}=r+P$$

where $\hat{I}$ denotes the current frame, r denotes the residue, and P denotes the temporal prediction. In single-loop decoding, each supported layer may be decoded with a single motion compensation loop. In order to achieve this, all layers that are used to inter-layer intra predict higher layers are coded using constrained intra-prediction. In constrained intra prediction, intra mode MBs are intra-coded without referring to any samples from neighboring inter-coded MBs. On the other hand, HEVC allows multi-loop decoding for SVC, in which an SVC layer may be decoded using multiple motion compensation loops. For example, the base layer may be fully decoded first, and then the enhancement layer may be decoded.

Residual prediction as described above may be an efficient technique in an H.264 SVC extension. However, its performance may be further improved in an HEVC SVC extension, especially when multi-loop decoding is used in the HEVC SVC extension.

In the case of multi-loop decoding, difference domain motion compensation may be used in place of residual prediction. In SVC, an enhancement layer may be coded using pixel domain coding or difference domain coding. In pixel domain coding, the input pixels for an enhancement layer pixels may be coded, as for a non-SVC HEVC layer. On the other hand, in difference domain coding, difference values for an enhancement layer may be coded. The difference values may be the difference between the input pixels for the enhancement layer and the corresponding scaled base layer reconstructed pixels. Such difference values may be used in motion compensation for difference domain motion compensation.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer prediction samples.

However, using difference domain motion compensation in inter-layer prediction introduces two sets of motion estimation and motion compensation, since motion estimation and motion compensation are often used for both pixel domain and difference domain. Introducing two sets of motion estimation and motion compensation may lead to higher buffer and computational cost, which may not be practical for an encoder or a decoder. In addition, coding two sets of motion vectors may reduce coding efficiency since motion field may become irregular when the two sets of motion vectors have different properties and are interleaved at coding unit (CU) level. Moreover, motion estimation in difference domain requires that the base layer and enhancement layer share the same motion. Further, difference domain motion compensation does not work with single-loop decoding since the derivation of differential pictures between two layers is based on fully reconstructed pictures of each layer.

The techniques described in this disclosure may address issues relating to reducing the complexity and cycles required to detect background content, which may further simplify the overall mode decision and motion estimation processes for a video encoder. The techniques may further address issues relating to adaptively adjusting a background detection threshold value, allowing a video encoder to save on computational resources while also preserving video quality.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, a video encoding and decoding system 10 includes a source device 12 that provides encoded video data to be decoded at a later time by a destination device 14. In particular, the source device 12 provides the video data to the destination device 14 via a computer-readable medium 16. The source device 12 and the destination device 14 may comprise any of a wide range of devices, including desktop computers, notebook (e.g., laptop) computers, tablet computers, set-top boxes, telephone handsets (e.g., smartphones), televisions, cameras, display devices, digital media players, video gaming consoles, video streaming devices, etc. In some cases, the source device 12 and the destination device 14 may be equipped for wireless communication.

As mentioned above, the destination device 14 may receive the encoded video data to be decoded via the computer-readable medium 16. The computer-readable medium 16 may comprise any type of medium or device capable of moving the encoded video data from the source device 12 to the destination device 14. In one example, the computer-readable medium 16 may comprise a communication medium (not pictured) to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may also form part of a packet-based network, such as a local area network, a wide-area network, or a global network (e.g., the Internet). The communication medium may include routers, switches, base stations, or any other equipment that may be useful to facilitate communication from the source device 12 to the destination device 14.

In some examples, the encoded data may be output from an output interface 22 to a storage device (not pictured). Similarly, the encoded data may be accessed from the storage device by an input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device 12. The destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. The destination device 14 may access the encoded video data through any standard data connection, including an Internet connection. The data connection may include a wireless channel (e.g., a Wi-Fi connection), a wired connection (e.g., DSL, cable modem, etc.), or a combination of both suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, the system 10 may be configured to support one-way or two-way video transmission for applications such as video streaming, video playback, video broadcasting, video telephony, etc.

In the example of FIG. 1, the source device 12 includes a video source 18, a video encoder 20, and the output interface 22. The destination device 14 includes the input interface 28, a video decoder 30, and a display device 32. In accordance with this disclosure, the video encoder 20 of the source device 12 may be configured to apply techniques for coding a bitstream including video data conforming to multiple standards or standard extensions. In other examples, the source device 12 and the destination device 14 may include other components or arrangements. For example, the source device 12 may receive video data from an external video source, such as an external camera. Likewise, the destination device 14 may interface with an external display device, rather than the integrated display device 32.

Although the techniques of this disclosure are generally performed by a video encoding device, the techniques may also be performed by a video encoder/decoder, typically referred to as a "CODEC." Moreover, the techniques of this disclosure may also be performed by a video preprocessor. The source device 12 and the destination device 14 are merely examples of such coding devices in which the source device 12 generates coded video data for transmission to the destination device 14. In some examples, the source device 12 and the destination device 14 may operate in a substantially symmetrical manner such that they each include video encoding and decoding components. Hence, the system 10 may support one-way or two-way video transmission between the source device 12 and the destination device 14, e.g., for video streaming, video playback, video broadcasting, video telephony, etc.

The video source 18 of the source device 12 may include a video capture device (not pictured), such as a video camera, a video archive containing previously captured video, a video feed interface to receive video from a video content provider, etc. As a further alternative, the video source 18 may generate computer graphics-based data or a combination of live video, archived video, and computer-generated video. In some cases, if the video source 18 is a video camera, the source device 12 and the destination device 14 may be camera phones or video phones. In another embodiment, the techniques described in this disclosure may be applicable to video coding in general and may be applied to wireless and/or wired applications. In each case, the captured, pre-captured, or computer-generated video may be encoded by the video encoder 20. The encoded video information may then be output by the output interface 22 onto the computer-readable medium 16.

The computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device 12 and provide the encoded video data to the destination device 14, e.g., via network transmission, direct wired communication, etc. Similarly, a computing device of a medium production facility, such as a disc stamping facility, may receive the encoded video data from the source device 12 and produce a disc containing the encoded video data. Therefore, the computer-readable medium 16 may include one or more computer-readable media of various forms.

The input interface 28 of the destination device 14 may receive information from the computer-readable medium 16. The information of the computer-readable medium 16 may include syntax information defined by the video encoder 20. The syntax information may also be used by the video decoder 30, which may include syntax elements describing characteristics and/or processing of blocks and other coded units. The display device 32 may display the decoded video data to a user and may comprise any of a variety of display devices such as a cathode ray tube (CRT), a liquid crystal display (LCD), a plasma display, an organic light emitting diode (OLED) display, or another type of display device.

The video encoder 20 and the video decoder 30 may operate according to a video coding standard, such as the High Efficiency Video Coding (HEVC) standard or any of its variations (e.g., the HEVC Test Model (HM)). Alternatively, the video encoder 20 and the video decoder 30 may operate according to other proprietary or industry standards, such as the ITU-T H.264 standard (MPEG-4), Part 10, Advanced Video Coding (AVC), ITU-T H.263, ITU-T H.262 (ISO/IEC MPEG-2 Visual), ISO/IEC MPEG-1 Visual, ITU-T H.261, or extensions of any such standards. In some aspects, the video encoder 20 and the video decoder 30 may be integrated with an audio encoder, audio decoder, MUX-DEMUX units (not pictured), or other hardware and software to handle encoding of both audio and video in a common data stream or separate data streams.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware, or any combinations thereof. If necessary to perform the techniques of this disclosure, the video encoder 20 and/or the video decoder 30 may store instructions for software in a suitable, non-transitory computer-readable medium and execute the instructions in hardware using one or more processors. Each of the video encoder 20 and the video decoder 30 may be included in one or more encoders or decoders, either of which may be integrated as part of a combined encoder/decoder (CODEC) in a respective device. A device including the video encoder 20 and/or the video decoder 30 may comprise an integrated circuit, a microprocessor, and/or a wireless communication device, such as a cellphone.

The HEVC standard specifies that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or, in some instances, greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. The video encoder 20 of FIG. 1 may operate on video blocks within individual video slices in order to encode the video data. A video block may correspond to a coding node within a CU. The video blocks may have fixed or varying sizes, and may differ in size according to a specified coding standard.

HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on the bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block may have N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, the video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. The video encoder 20 may form the TUs including the residual data for the CU, and then transform the TUs to produce transform coefficients for the CU.

Following any transforms to produce transform coefficients, the video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, the video encoder 20 may utilize a predefined scan order to scan the quantized transform coefficients to produce a serialized vector that can be entropy encoded. In other examples, the video encoder 20 may perform an adaptive scan. After scanning the quantized transform coefficients to form a one-dimensional vector, the video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. The video encoder 20 may also entropy encode syntax elements associated with the encoded video data for use by the video decoder 30 in decoding the video data.

The video encoder 20 may further send syntax data, such as block-based syntax data, frame-based syntax data, and GOP-based syntax data, to the video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
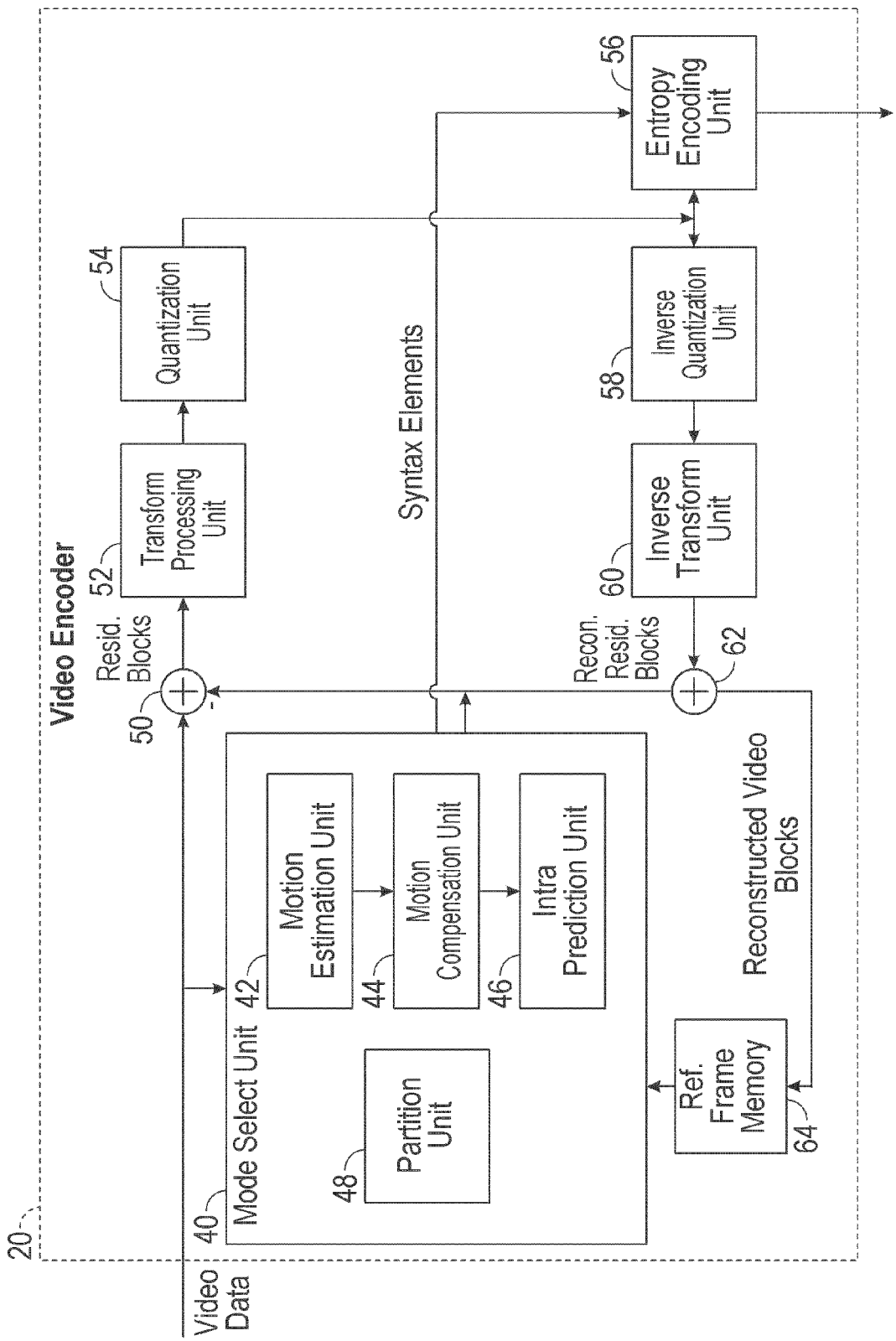
FIG. 2 is a block diagram illustrating an example of a video encoder that may implement techniques in accordance with aspects described in this disclosure.

FIG. 2 is a block diagram illustrating an example of a video encoder that may implement any of the techniques described below, including the methods described in FIGS. 4 and 5, below. One or more of the units of the video encoder 20 may be configured to perform any or all of the techniques of this disclosure. As one example, a transform processing unit 52 and an inverse transform unit 60 may be configured to perform any or all of the transform techniques described in this disclosure. However, aspects of this disclosure are not so limited. In some examples, the techniques described in this disclosure may be shared among the various components of the video encoder 20. In some examples, a processor (not shown) may be configured to perform any or all of the techniques described in this disclosure.

The video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

The video encoder 20 may receive a current video block within a video frame to be encoded. In the example of FIG. 2, the video encoder 20 includes a mode select unit 40, a reference frame memory 64, a summer 50, the transform processing unit 52, a quantization unit 54, and an entropy encoding unit 56. The mode select unit 40 includes a motion estimation unit 42, a motion compensation unit 44, an intra-prediction unit 46, and a partition unit 48. For video block reconstruction, the video encoder 20 may also include an inverse quantization unit 58, an inverse transform unit 60, and a summer 62. A deblocking filter (not pictured) may also be included to filter block boundaries to remove blockiness artifacts from reconstructed video. If desired, the deblocking filter would typically filter the output of the summer 62. Additional filters (in loop or post loop) may also be used in addition to the deblocking filter. Such filters are not shown for brevity, but if desired, may filter the output of the summer 50 (as an in-loop filter).

During the encoding process, the video encoder 20 may receive a video frame or slice to be coded. The frame or slice may be divided into multiple video blocks. The motion estimation unit 42 and the motion compensation unit 44 may perform inter-predictive coding of the received video block relative to one or more blocks in one or more reference frames to provide temporal prediction. The intra-prediction unit 46 may alternatively perform intra-predictive coding of the received video block relative to one or more neighboring blocks in the same frame or slice as the block to be coded to provide spatial prediction. The video encoder 20 may perform multiple coding passes, e.g., to select an appropriate coding mode for each block of video data.

Moreover, the partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). The mode select unit 40 may further produce a quadtree data structure indicative of partitioning of an LCU into sub-CUs. Leaf-node CUs of the quadtree may include one or more PUs and one or more TUs.

The mode select unit 40 may select one of the coding modes, intra or inter, e.g., based on error results, and provide the resulting intra- or inter-coded block to the summer 50 to generate residual block data and to the summer 62 to reconstruct the encoded block for use as a reference frame. The mode select unit 40 may also provide syntax elements, such as motion vectors, intra-mode indicators, partition information, and other such syntax information, to the entropy encoding unit 56.

The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, the video encoder 20 may calculate values for sub-integer pixel positions of reference pictures stored in the reference frame memory 64. For example, the video encoder 20 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the reference frame memory 64. The motion estimation unit 42 sends the calculated motion vector to the entropy encoding unit 56 and the motion compensation unit 44.

Motion compensation, performed by the motion compensation unit 44, may involve fetching or generating the predictive block based on the motion vector determined by the motion estimation unit 42. Again, the motion estimation unit 42 and the motion compensation unit 44 may be functionally integrated, in some examples. Upon receiving the motion vector for the PU of the current video block, the motion compensation unit 44 may locate the predictive block to which the motion vector points in one of the reference picture lists. The summer 50 may form a residual video block by subtracting pixel values of the predictive block from the pixel values of the current video block being coded, forming pixel difference values, as discussed below. The motion estimation unit 42 may perform motion estimation relative to luma components, and the motion compensation unit 44 may use motion vectors calculated based on the luma components for both chroma components and luma components. The mode select unit 40 may also generate syntax elements associated with the video blocks and the video slice for use by the video decoder 30 in decoding the video blocks of the video slice. The syntax elements may represent prediction information at one or more of a video sequence level, a video frame level, a video slice level, a video CU level, or a video PU level. For example, the motion compensation unit 44 may generate syntax elements indicating video block information including sizes of CUs, PUs, and TUs, and motion vector information for intra-mode prediction.

As described above, in modern video encoding (e.g., in HEVC), the mode decision and motion estimation modules (e.g., as performed by the mode select unit 40 and the motion estimation unit 42, respectively) have become more complex and computationally intensive. To reduce the effects of this problem, the transform processing unit 52 may further be configured to perform any of the methods described above and below in regards to reducing the complexity and cycles required for the video encoder 20 to detect background content, which may further simplify the processes performed by the mode select unit 40 and/or the motion estimation unit 42.

As further described below, the methods of detecting background described in this disclosure may be performed by any unit of the encoder 20, including but not limited to the transform processing unit 52. In one embodiment, the transform processing unit 52 determines and utilizes a distance metric value between an initial block value in a current frame (or picture) and a block value (e.g., a spatially collocated block) in a temporally neighboring frame (or picture), as further described in relation to FIG. 4 below.

As an example, the transform processing unit 52 may determine the SAD of a 64×64 CU by summing the SAD's of all of the 8×8 CU's within the 64×64 CU. The transform processing unit 52 may then compare the 64×64 block's SAD with a threshold background value to determine whether the 64×64 is background. In another embodiment, the transform processing unit 52 may be further configured to adaptively adjust the threshold background value by comparing the distance metric value of the current block with a previous block. If the transform processing unit 52 determines that the CU is background, then the video encoder 20 may reduce the complexity of its mode decision and motion estimation for that CU. In this way, the transform processing unit 52, the mode select unit 40, and/or the motion estimation unit 42 may reduce the time and complexity of their computations, while also maintaining video quality. This process is further described and demonstrated in FIGS. 4-5.

In the example described above, the transform processing unit 52 is configured to reduce mode decision and motion estimation complexity for a 64×64 CU after determining it is background. In other cases, if the transform processing unit 52 does not determine the 64×64 CU is background, it may be further configured to identify sub-blocks within the 64×64 CU (e.g., four 32×32 sub-blocks) and determine whether each sub-block is background. Moreover, in some cases, the transform processing unit 52 may be configured to identify further sub-blocks within the sub-blocks (e.g., four 16×16 sub-blocks within each 32×32 block, four 8×8 sub-blocks within each 16×16 block, etc.) to identify background sub-blocks, some of which may have different sizes than other sub-blocks.

The intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, the intra-prediction unit 46 may encode a current block using various intra-prediction modes, e.g., during separate encoding passes, and the intra-prediction unit 46 (or the mode select unit 40, in some examples) may select an appropriate intra-prediction mode to use from the tested modes.

For example, the intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. The intra-prediction unit 46 may calculate ratios from the distortions and rates for the various encoded blocks to determine which intra-prediction mode exhibits the best rate-distortion value for the block.

After selecting an intra-prediction mode for a block, the intra-prediction unit 46 may provide information indicative of the selected intra-prediction mode for the block to the entropy encoding unit 56. The entropy encoding unit 56 may encode the information indicating the selected intra-prediction mode. The video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 forms a residual video block by subtracting the prediction data from the mode select unit 40 from the original video block being coded. The summer 50 may perform this subtraction operation. The transform processing unit 52 may apply a transform, such as a discrete cosine transform (DCT) or a conceptually similar transform, to the residual block, producing a video block comprising residual transform coefficient values. The transform processing unit 52 may perform other transforms which are conceptually similar to DCT. Wavelet transforms, integer transforms, sub-band transforms or other types of transforms may also be used. The transform processing unit 52 may then apply the transform to the residual block, producing a block of residual transform coefficients. The transform may convert the residual information from a pixel value domain to a transform domain, such as a frequency domain. More specifically, prior to application of the transform, the TU may comprise residual video data in the pixel domain, and, following application of the transform, the TU may comprise transform coefficients that represent the residual video data in the frequency domain.

Conventionally, the video encoder 20 maintains separate context models for each of the different sizes of TUs supported by the implemented video compression standard. For the HEVC standard, additional transform unit sizes, e.g., 32×32 up to 128×128, may be used to improve video coding efficiency, but the additional TU sizes also result in increased memory and computational requirements to maintain the context models for each of the additional transform unit sizes. In some cases, the larger TU sizes may use more contexts, which may result in increased memory and computational requirement to maintain the increased number of contexts for the larger TU sizes.

The transform unit 52 may send resulting transform coefficients to the quantization unit 54. The quantization unit 54 may then quantize the transform coefficients to further reduce the bit rate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively, the entropy encoding unit 56 may perform the scan.

Following quantization, the entropy encoding unit 56 may entropy code the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. In the case of context-based entropy encoding, context may be based on neighboring blocks. Following the entropy encoding by the entropy encoding unit 56, the encoded bitstream may be transmitted to another device (e.g., the video decoder 30) or archived for later transmission or retrieval.

The inverse quantization unit 58 and the inverse transform unit 60 may apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame memory 64. The motion compensation unit 44 may also apply one or more interpolation filters to the reconstructed residual block to calculate sub-integer pixel values for use in motion estimation. The summer 62 may add the reconstructed residual block to the motion compensated prediction block produced by the motion compensation unit 44 to produce a reconstructed video block for storage in the reference frame memory 64. The reconstructed video block may then be used by the motion estimation unit 42 and the motion compensation unit 44 as a reference block to inter-code a block in a subsequent video frame.

Figure 3:
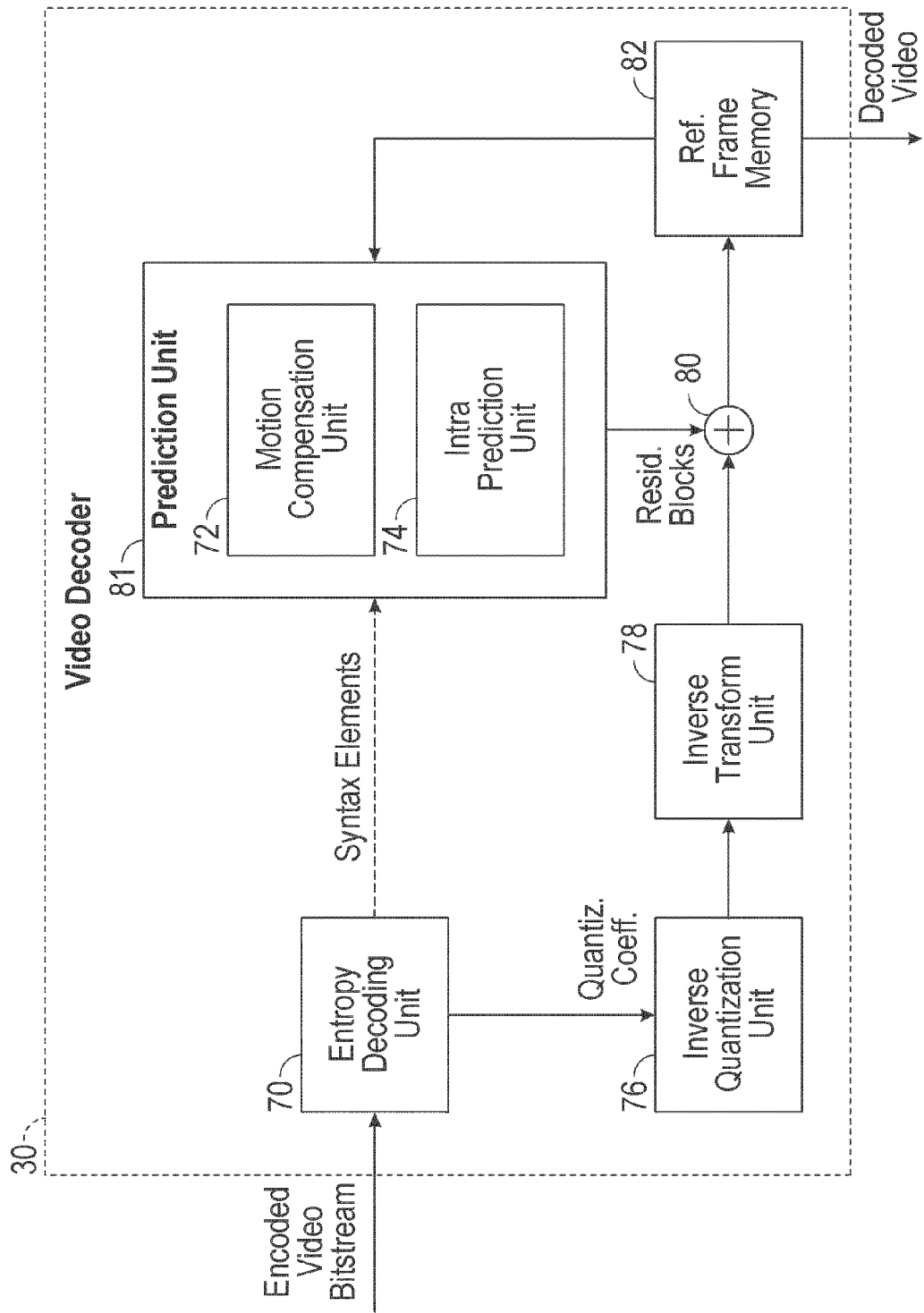
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. The techniques described in this disclosure may utilize various components of the video decoder 30. In some examples, a processor (not shown) may be configured to perform any or all of the techniques.

In the example of FIG. 3, the video decoder 30 includes an entropy decoding unit 70, a prediction unit 81 further including a motion compensation unit 72 and an intra-prediction unit 74, an inverse quantization unit 76, an inverse transformation unit 78, a reference frame memory 82, and a summer 80. The video decoder 30 may perform a decoding pass generally reciprocal to the encoding pass described with respect to the video encoder 20 (e.g., see FIG. 1 and FIG. 2). The motion compensation unit 72 may generate prediction data based on motion vectors received from the entropy decoding unit 70, while the intra-prediction unit 74 may generate prediction data based on intra-prediction mode indicators received from the entropy decoding unit 70.

Conventionally, the video decoder 30 would maintain separate context models for each of the different sizes of TUs supported by the implemented video compression standard. For the HEVC standard, additional transform unit sizes, e.g., 32×32 up to 128×128, may be utilized to improve video coding efficiency, but the additional TU sizes also result in increased memory and computational requirements to maintain the context models for each of the additional transform unit sizes.

During the decoding process, the video decoder 30 may receive an encoded video bitstream that represents video blocks of an encoded video slice and associated syntax elements from the video encoder 20. The entropy decoding unit 70 of the video decoder 30 entropy decodes the bitstream to generate quantized coefficients, motion vectors or intra-prediction mode indicators, and other syntax elements. The entropy decoding unit 70 may then forward the motion vectors to and other syntax elements to the motion compensation unit 72. The video decoder 30 may receive the syntax elements at the video slice level and/or the video block level.

When the video slice is coded as an intra-coded (I) slice, the intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, the motion compensation unit 72 may produce predictive blocks for a video block of the current video slice based on the motion vectors and other syntax elements received from the entropy decoding unit 70. The predictive blocks may be produced from one of the reference pictures within one of the reference picture lists. The video decoder 30 may construct the reference frame lists, List 0 and List 1, using default construction techniques based on reference pictures stored in the reference frame memory 82. The motion compensation unit 72 may determine prediction information for a video block of the current video slice by parsing the motion vectors and other syntax elements, and use the prediction information to produce the predictive blocks for the current video block being decoded. For example, the motion compensation unit 72 may use some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

The motion compensation unit 72 may also perform interpolation based on interpolation filters. The motion compensation unit 72 may use interpolation filters as used by the video encoder 20 during encoding of the video blocks to calculate interpolated values for sub-integer pixels of reference blocks. In this case, the motion compensation unit 72 may determine the interpolation filters used by the video encoder 20 from the received syntax elements and use the interpolation filters to produce predictive blocks.

The inverse quantization unit 76 may inverse quantize, e.g., de-quantize, the quantized transform coefficients provided in the bitstream and decoded by the entropy decoding unit 70. The inverse quantization process may include use of a quantization parameter QPY calculated by the video decoder 30 for each video block in the video slice to determine a degree of quantization and, likewise, a degree of inverse quantization that should be applied.

The inverse transform unit 78 may apply an inverse transform, e.g., an inverse DCT, an inverse integer transform, or a conceptually similar inverse transform process, to the transform coefficients in order to produce residual blocks in the pixel domain. After the motion compensation unit 72 generates the predictive block for the current video block based on the motion vectors and other syntax elements, the video decoder 30 may form a decoded video block by summing the residual blocks from the inverse transform unit 78 with the corresponding predictive blocks generated by the motion compensation unit 72. The summer 80 may perform this summation operation. A deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture may then be stored in the reference picture memory 82, which may store reference pictures used for subsequent motion compensation. The reference frame memory 82 may also store decoded video for later presentation on a display device, such as the display device 32 of FIG. 1.

Figure 4:
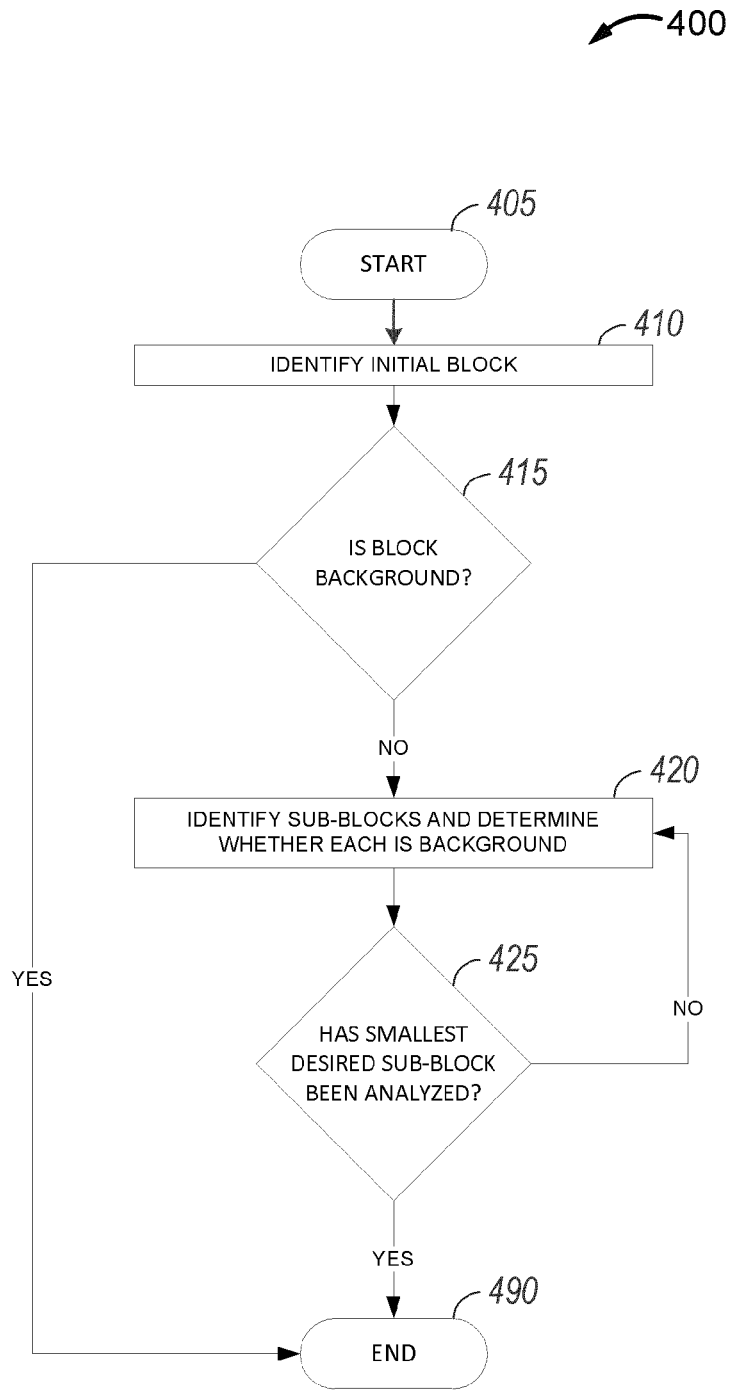
FIG. 4 illustrates a flowchart of a method of determining whether a video block or its sub-blocks contain background content.

FIG. 4 illustrates a flowchart of a method 400 of determining whether a video block or its sub-blocks contain background content. The method 400 may be performed by a processor or video encoder, including but not limited to the video encoder 20 discussed above with respect to FIG. 2. In some embodiments, the method 400 is performed by a transform processing unit, such as, but not limited to, the transform processing unit 52 of FIG. 2. In addition, although the method 400 is described within the context of being performed by a transform processing unit, it should be understood that this is for illustration purposes only and does not limit the invention in any way.

As described above, by identifying video blocks or sub-blocks of video blocks as background areas, the transform processing unit 52 may reduce the complexity of a mode decision process (e.g., the mode decision processes performed by the mode select unit 40 of FIG. 2) and/or a motion estimation process (e.g., the motion estimation processes performed by the motion estimation unit 42 of FIG. 2) for the background blocks.

First, at block 405, the method 400 begins. Then at block 410, the transform processing unit 52 may identify an initial video block to analyze. In one implementation, the initial video block may be a 64×64 CU (or a block of any other size).

Then at block 415, the transform processing unit 52 may determine whether the video block is background. To accomplish this, as discussed above in regards to FIG. 2, the transform processing unit 52 may determine and utilize a distance metric value of the video block and compare that distance metric value with a background threshold value. The distance metric value may provide an indication of the extent to which the video information within the video block changed from the previous frame to the current frame. For example, if the video information did not change at all or changed very little, then the distance metric value may be zero or close to zero. In one embodiment, the distance metric value may be a sum of absolute differences (SAD), which may indicate a change of pixel information from one frame to the next. In one embodiment, an SAD of a large CU may be determined by summing the SAD's of the block's individual, smaller CU's (e.g., its 8×8 CU's). In another embodiment, the distance metric value may be a sum of squared errors, which may further indicate a change of pixel information from one frame to the next. The distance metric value may also be based on any other indication of a change of pixel information from one frame to the next.

To improve coding efficiency, the transform processing unit 52 may sum the distance metric units (e.g., the SAD's) associated with the individual, smaller coding units (CU's) of the video block (e.g., its 8×8 CU's) and then compare that sum with the background threshold value. If the distance metric value is less than the background threshold value, then the transform processing unit 52 may classify the video block as background. If the distance metric value is greater than or equal to the background threshold value, then the transform processing unit 52 may classify the video block as foreground (e.g., not classify the video block as background).

In one example, the transform processing unit 52 may determine the SAD of a 64×64 CU by summing the SAD's of all of the 8×8 CU's within the 64×64 CU. The transform processing unit 52 may then compare that SAD with the threshold background value to determine whether the 64×64 CU is background. In one implementation, the background threshold value may be a predetermined value. In another embodiment, the transform processing unit 52 may be further configured to adaptively adjust the threshold background value by comparing the distance metric value of the current block with a previous block, as further described in regards to FIG. 5.

If the transform processing unit 52 determines that the video block is background, then the video encoder 20 may reduce the complexity of its mode decision and motion estimation for that block. For example, the motion estimation unit 42 may be configured to simplify motion estimation for the background block in a number of different ways. For example, the motion estimation unit 42 may search a lesser number of reference frames for the background blocks. To search a lesser number of reference frames, the motion estimation unit 42 may implement one or more of the following methods: (1) search the reference frame 0 only; (2) search a predefined, smaller range (e.g., smaller radius) of frames of the previous frame; (3) use a predictor-only search; (4) conditionally skip searching the half-pels and/or quarter-pels; or (5) any other method for searching a lesser number of reference frames.

In one embodiment, when the motion estimation unit 42 uses a predictor-only search to reduce the complexity of motion estimation for background blocks, the motion estimation unit 42 may stop search refinement after searching the first predictors (e.g., spatial and/or temporal predictors). For foreground blocks, on the other hand, the motion estimation unit 42 may search neighboring block motion vectors, analyze their predictor results for the best match, then further refine its search in this manner until a sufficient result is obtained.

In one embodiment, when the motion estimation unit 42 conditionally skips searching the half-pels and/or quarter pels to reduce the complexity of motion estimation for background blocks, the motion estimation unit 42 may generate motion vector predictors from neighboring blocks in the current frame of the background blocks. Those predictors may then be used in a co-located block from the previous frame. Each predictor may then be applied to find the most appropriate test block and to compare the co-located block to the current frame to determine which is closest. For foreground blocks, on the other hand, the motion estimation unit 42 may first center its focus on the integer pel location, then search a number of (e.g., nine) linearly interpolated half-pel locations, and then further refine its search with a corresponding number of linearly interpolated quarter-pel locations.

As another example of reducing encoding complexity for background blocks, if the transform processing unit 52 determines that the video block is background, then the mode select unit 40 may be configured to simplify mode decision in a number of different ways. For example, the mode select unit 40 may skip intra-mode decision going forward. As another example, the mode select unit 40 may more quickly identify CU size and skip mode decision for smaller blocks within the background block. As an example, if a 32×32 block is determined to be background, then the mode select unit 40 may instruct the video encoder 20 to skip the mode decision for any blocks within the 32×32 block that are smaller than 32×32. As another example, to simplify the mode decision, the mode select unit 40 may test a smaller number of merge candidates. Merge candidates may refer to a mode decision process in which various blocks of a previous frame are searched to determine the neighboring blocks' motion vectors. For foreground video blocks, this search and determination may occur five or more times. For background video blocks, the methods described in this disclosure may only perform one or two search and determinations.

In any case, if at block 415 the transform processing unit 52 determines that the video block is background, then the method 400 proceeds to block 490 and ends. However, if at block 416 the transform processing unit 52 determines that the video block is not background, then the method 400 proceeds to block 420. At block 420, the transform processing unit 52 may identify sub-blocks within the video block and then determine whether each sub-block is background.

For example, in the case of the 64×64 CU described above, the transform processing unit 52 may identify sub-blocks within the 64×64 CU (e.g., four 32×32 sub-blocks) and determine whether each sub-block is background using the methods as described in regards to block 415 above. Again, to improve coding efficiency, the transform processing unit 52 may sum the individual, smaller coding units (CU's) of the video blocks (e.g., the 8×8 CU's that make up each of the sub-blocks) and then compare their sums with the background threshold value. For each individual sub-block, if the distance metric value is less than the background threshold value, then the transform processing unit 52 may classify the video sub-block as background. If the distance metric value is greater than or equal to the background threshold value, then the transform processing unit 52 may classify the video sub-block as foreground. Again, the video encoder 20 may then reduce the complexity of its mode decision and motion estimation for each of the sub-blocks it identified as background as described above in regards to block 415.

Once the transform processing unit 52 has identified which sub-blocks are background, then at block 425, the transform processing unit 52 may determine whether a smallest desired sub-block has been analyzed. In one example, the smallest desired sub-block size may be 8×8.

If the transform processing unit 52 determines that the smallest desired sub-block has been analyzed, then the method ends at block 490. Otherwise, if the transform processing unit 52 determines that the smallest desired sub-block has not been analyzed, then the method 400 returns to block 420 to further identify sub-blocks within the previously identified foreground sub-blocks and then determine whether each of the new sub-blocks are background using the methods as described in regards to blocks 415-420 above.

Using the above example, if the video encoder 20 determined that two of the 32×32 sub-blocks were background and that two were foreground at block 420, and if the smallest desired sub-block was 8×8 at block 425, then the method would return to block 420. At that point, the video encoder 20 would further identify sub-blocks within the two 32×32 foreground sub-blocks (e.g., four 16×16 sub-blocks within each) and then proceed to identify which of the eight new sub-blocks were background using the methods described above.

Having reached the end of the method at block 490, the video encoder 20 may then process a subsequent frame according to the methods described below in regards to FIG. 5.

Figure 5:
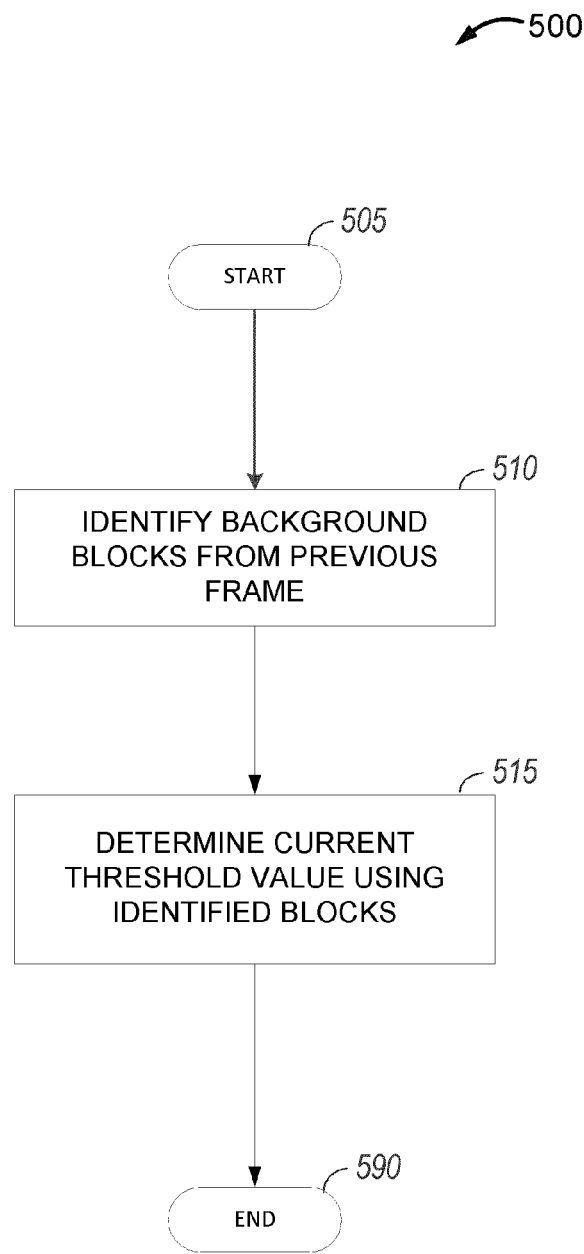
FIG. 5 illustrates a flowchart of one method of adaptively adjusting a background threshold value to determine whether a block is a background block.

FIG. 5 illustrates a flowchart of one method 500 of adaptively adjusting a background threshold value (e.g., the background threshold value discussed in regards to FIG. 4) to determine whether a block is a background block. The method 500 may be performed by a processor or video encoder, including but not limited to the video encoder 20 discussed above with respect to FIG. 2. In some embodiments, the method 500 is performed by a transform processing unit, such as, but not limited to, the transform processing unit 52 of FIG. 2. In addition, although the method 500 is described within the context of being performed by a transform processing unit, it should be understood that this is for illustration purposes only and does not limit the invention in any way.

As described above, the background threshold value may be compared with a distance metric value (e.g., SAD) of a video block to determine whether the video block is background. In some cases, it may improve coding efficiency to store a previous block's (or a "previous frame's") distance metric values to adaptively adjust the background threshold value for use in subsequent block (or frame) analysis. In other cases, the background threshold value may be fixed or predetermined for some blocks and adaptive for other blocks. Compared with using fixed thresholds, updating the background threshold value adaptively may provide better classification of background areas versus foreground areas for different types of video content, which may lower encoding complexity and increase coding efficiency.

The method 500 begins at block 505. At block 510, a transform processing unit 52 may identify background blocks from a previous frame (or previous block). In one implementation, the previous frame may be the frame (or block) that the transform processing unit 52 analyzed for background content and the background blocks may be those blocks that the transform processing unit 52 identified as background during the methods described in regards to FIG. 4.

Then at block 515, the transform processing unit 52 may determine an adjusted background threshold value (or a current threshold value) using the identified background blocks. If no background blocks were identified in the previous frame (e.g., all blocks were classified as foreground), the transform processing unit 52 may keep the background threshold value the same and end the method at block 590. In that case, the video encoder 20 may proceed by analyzing the current frame according to the methods described in FIG. 4 using the original background threshold value.

In the case that one or more blocks have been classified as background, the transform processing unit 52 may determine a classification of the motion vectors within the previous frame. If the motion vectors are of a certain classification (e.g., global motion vectors or zero motion vectors), then the transform processing unit 52 may adjust the background threshold value according to one or more distance metric values of the blocks of the previous frame. Global motion vectors may refer to a video frame with blocks that all move together in the same direction but do not otherwise change, e.g., a camera panning across a static scene. Zero motion vectors may refer to a video frame that is exactly or nearly exact to the previous frame, e.g., the video is still. To compute the distance metric value between the current and previous frames, a spatial offset value may be applied, which may be based on certain classifications of motion vectors (e.g., global motion vectors or zero motion vectors). The transform processing unit 52 may then continue analyzing the current frame according to the methods described in FIG. 4 using the adjusted background threshold value.

In one embodiment, the distance metric value may be calculated by treating the previous frame as an original pixel or a reference pixel. In the case that the previous frame is treated as an original pixel, memory requirements may increase. To reduce memory requirements, it is sometimes advantageous to treat the previous frame instead as a reference pixel. However, the reference pixel approach requires that the system take quantization parameters (QP) into account. In one embodiment, the video encoder 20 may set the QP's. Since some distance metric values (e.g., SAD) vary greatly depending on QP (e.g., if QP is high, then the reconstructed frame quality may be low), it may be advantageous to store the previous frame's reconstructed pixel in a reference frame buffer.

In one embodiment, the distance metric value used to adjust the background threshold value may be a normalized SAD of the previous frame. The normalized value may compensate for any QP factors, as described above. As an example, the video encoder 20 may define two variables, $Sum_{metric}$ and $Sum_{scale}$, to represent the sum of the SAD values and the normalized sum of the SAD values, respectively. $Sum_{metric}$ and $Sum_{scale}$ may be initialized as zero at the beginning of the frame. As explained above, if the motion vectors were classified in certain ways to be equal to the spatial offset between the previous frame and the current frame (e.g., either global motion or zero motion), then the previous frame's metric values may be used to update $Sum_{metric}$ and $Sum_{scale}$ (e.g., adaptively update the background threshold value) according to the below set of equations. Each of Equations (1)-(6) represent an example original N×N video block size of 64×64, but N could also be higher or lower.

$$\text{New } Sum_{metric} = Sum_{metric} + Met_{N \times N}, \quad (1)$$

where $Met_{N \times N}$ represents the metric value (e.g., the SAD) of the entire video block $$\text{New } Sum_{scale} = Sum_{scale} + \left(\frac{N}{64}\right)^2, \quad (2)$$

where $N$ represents the length or width of an $N \times N$ video block $Sum_{metric}$ and $Sum_{scale}$ may also be updated according to the following alternate set of equations.

$$\text{New } Sum_{metric} = Sum_{metric} + Met_{N \times N} * \left(\frac{64}{N}\right)^2 \quad (3)$$

$$\text{New } Sum_{scale} = Sum_{scale} + 1 \quad (4)$$

At the end of the frame, the new background threshold value ($Th_{N \times N}$) may be updated according to the below set of equations.

$$Th_{64 \times 64} = \frac{Sum_{metric}}{Sum_{scale}}, \quad (5)$$

where $Th_{64 \times 64}$ represents the original background threshold value for the 64 × 64 video block $$Th_{N \times N} = \frac{Th_{64 \times 64}}{\left(\frac{64}{N}\right)^2} \quad (6)$$

As an example, if the transform processing unit 52 determines that the previous frame was encoded using inter-picture prediction with one of the above described motion vector classifications, then the previous frame's distance metric value (e.g., its SAD) may be stored and normalized as $$\frac{1^{th}}{64}$$

of the entire block at the end of the frame, according to the equations as described above. This value may then become the background threshold value for the next frame. In one embodiment, this process may occur for each frame, adaptively updating the threshold for each consecutive frame.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A video encoder, comprising:
a memory configured to store a video block; and
a processor in communication with the memory, the processor configured to:
determine whether the video block is background by determining a first distance metric and comparing the first distance metric to a first background threshold value, wherein the first distance metric provides an indication of the extent to which information within the video block has changed from information within a corresponding block located in a previous temporal frame; and
determine, when the video block is not background, whether one or more sub-blocks of the video block are background by determining a second distance metric and comparing the second distance metric to a second background threshold value, wherein the second distance metric provides an indication of the extent to which information within the sub-blocks has changed from information within corresponding sub-blocks located in the previous temporal frame,
wherein the first or the second background threshold are adaptively adjusted based on one or more distance metric values of the corresponding video block or the corresponding sub-blocks located in the previous temporal frame if the corresponding video block or the corresponding sub-blocks located in the previous temporal frame comprises motion vectors corresponding to one of a plurality of predetermined different motion vector classifications.

2. The video encoder of claim 1, wherein the processor is further configured to determine that the video block or one or more sub-blocks is background if the first or the second distance metric is less than the first or the second background threshold value.

3. The video encoder of claim 1, wherein the first or the second background threshold are adaptively changed based on a sum of the distance metrics associated with blocks of the previous temporal frame in which a motion vector associated with the blocks of the previous temporal frame is the same as a spatial offset value, wherein the spatial offset value equals either a global motion value or a zero motion vector value.

4. The video encoder of claim 1, wherein the corresponding block is spatially collocated with respect to the video block.

5. The video encoder of claim 1, wherein the processor is further configured to determine that the video block is not background if the content of video block changed more than a predetermined amount with respect to the previous temporal frame.

6. The video encoder of claim 1, wherein the sub-block is ¼ the size of the video block.

7. The video encoder of claim 1, wherein the processor is further configured to determine, when one of the sub-blocks of the video block is not background, whether one or more sub-sub-blocks of the sub-block are background by comparing the sub-sub-blocks of the sub-block to corresponding sub-sub-blocks located in the previous temporal frame.

8. The video encoder of claim 1, wherein the processor is further configured to utilize a motion decision process, a motion estimation process, or both, (1) to encode the video block when the video block is background, (2) to encode the one or more sub-blocks when the one or more sub-blocks are background, or (3) both.

9. A method of encoding video, the method comprising:
    storing a video block;
    determining whether the video block is background by determining a first distance metric and comparing the first distance metric to a first background threshold value, wherein the first distance metric provides an indication of the extent to which information within the video block has changed from information within a corresponding block located in a previous temporal frame;
    determining, when the video block is not background, whether one or more sub-blocks of the video block are background by determining a second distance metric and comparing the second distance metric to a second background threshold value, wherein the second distance metric provides an indication of the extent to which information within the sub-blocks has changed from information within corresponding sub-blocks located in the previous temporal frame,
    wherein the first or the second background threshold are adaptively adjusted based on one or more distance metric values of the corresponding video block or the corresponding sub-blocks located in the previous temporal frame if the corresponding video block or the corresponding sub-blocks located in the previous temporal frame comprises motion vectors corresponding to one of a plurality of predetermined different motion vector classifications.

10. The method of claim 9, further comprising determining that the video block or one or more sub-blocks is background if the first or the second distance metric is less than the first or the second background threshold value.

11. The method of claim 9, wherein the first or the second background threshold are adaptively changed based on a sum of the distance metrics associated with blocks of the previous temporal frame in which a motion vector associated with the blocks of the previous temporal frame is the same as a spatial offset value, wherein the spatial offset value equals either a global motion value or a zero motion vector value.

12. The method of claim 9, wherein the corresponding block is spatially collocated with respect to the video block.

13. The method of claim 9, further comprising determining that the video block is not background if the content of video block changed more than a predetermined amount with respect to the previous temporal frame.

14. The method of claim 9, wherein the sub-block is ¼ the size of the video block.

15. The method of claim 9, further comprising determining, when one of the sub-blocks of the video block is not background, whether one or more sub-sub-blocks of the sub-block are background by comparing the sub-sub-blocks of the sub-block to corresponding sub-sub-blocks located in the previous temporal frame.

16. The method of claim 9, further comprising utilizing a motion decision process, a motion estimation process, or both, (1) to encode the video block when the video block is background, (2) to encode the one or more sub-blocks when the one or more sub-blocks are background, or (3) both.

17. A non-transitory computer readable medium comprising code that, when executed, causes an apparatus to:
    store a video block;
    determine whether the video block is background by determining a first distance metric and comparing the first distance metric to a first background threshold value, wherein the first distance metric provides an indication of the extent to which information within the video block has changed from information within a corresponding block located in a previous temporal frame; and
    determine, when the video block is not background, whether one or more sub-blocks of the video block are background by determining a second distance metric and comparing the second distance metric to a second background threshold value, wherein the second distance metric provides an indication of the extent to which information within the sub-blocks has changed from information within corresponding sub-blocks located in the previous temporal frame,
    wherein the first or the second background threshold are adaptively adjusted based on one or more distance metric values of the corresponding video block or the corresponding sub-blocks located in the previous temporal frame if the corresponding video block or the corresponding sub-blocks located in the previous temporal frame comprises motion vectors corresponding to one of a plurality of predetermined different motion vector classifications.

18. The computer-readable medium of claim 17, further comprising code that, when executed, causes the apparatus to determine that the video block or one or more sub-blocks is background if the first or the second distance metric is less than the first or the second background threshold value.

19. The computer-readable medium of claim 17, wherein the first or the second background threshold are adaptively changed based on a sum of the distance metrics associated with blocks of the previous temporal frame in which a motion vector associated with the blocks of the previous temporal frame is the same as a spatial offset value, wherein the spatial offset value equals either a global motion value or a zero motion vector value.

20. The computer-readable medium of claim 17, further comprising code that, when executed, causes the apparatus to determine that the video block is not background if the content of video block changed more than a predetermined amount with respect to the previous temporal frame.

21. The computer-readable medium of claim 17, further comprising code that, when executed, causes the apparatus to determine, when one of the sub-blocks of the video block is not background, whether one or more sub-sub-blocks of the sub-block are background by comparing the sub-sub-blocks of the sub-block to corresponding sub-sub-blocks located in the previous temporal frame.

22. An apparatus for encoding video, comprising:
    means for storing a video block;
    means for determining whether the video block is background by determining a first distance metric and comparing the first distance metric to a first background threshold value, wherein the first distance metric provides an indication of the extent to which information within the video block has changed from information within a corresponding block located in a previous temporal frame; and means for determining, when the video block is not background, whether one or more sub-blocks of the video block are background by determining a second distance metric and comparing the second distance metric to a second background threshold value, wherein the second distance metric provides an indication of the extent to which information within the sub-blocks has changed from information within corresponding sub-blocks located in the previous temporal frame, wherein the first or the second background threshold are adaptively adjusted based on one or more distance metric values of the corresponding video block or the corresponding sub-blocks located in the previous temporal frame if the corresponding video block or the corresponding sub-blocks located in the previous temporal frame comprises motion vectors corresponding to one of a plurality of predetermined different motion vector classifications.

23. The apparatus of claim 22, further comprising means for determining that the video block or one or more sub-blocks is background if the first or the second distance metric is less than the first or the second background threshold value.

24. The apparatus of claim 22, wherein the first or the second background threshold are adaptively changed based on a sum of the distance metrics associated with blocks of the previous temporal frame in which a motion vector associated with the blocks of the previous temporal frame is the same as a spatial offset value, wherein the spatial offset value equals either a global motion value or a zero motion vector value.

25. The apparatus of claim 22, further comprising means for determining that the video block is not background if the content of video block changed more than a predetermined amount with respect to the previous temporal frame.

26. The apparatus of claim 22, further comprising means for determining, when one of the sub-blocks of the video block is not background, whether one or more sub-sub-blocks of the sub-block are background by comparing the sub-sub-blocks of the sub-block to corresponding sub-sub-blocks located in the previous temporal frame.

27. The video encoder of claim 1, wherein the first or the second distance metric comprises a sum of absolute differences or a sum of squared errors.

28. The method of claim 9, wherein the first or the second distance metric comprises a sum of absolute differences or a sum of squared errors.

29. The computer-readable medium of claim 17, wherein the first or the second distance metric comprises a sum of absolute differences or a sum of squared errors.

30. The apparatus of claim 22, wherein the first or the second distance metric comprises a sum of absolute differences or a sum of squared errors.

* * * * *